United States Patent
Miyata

(10) Patent No.: US 7,907,863 B2
(45) Date of Patent: Mar. 15, 2011

(54) IMAGE FORMING APPARATUS WITH A WRITING UNIT

(75) Inventor: Yuji Miyata, Kitanagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 544 days.

(21) Appl. No.: 11/691,669

(22) Filed: Mar. 27, 2007

(65) Prior Publication Data

US 2007/0230986 A1    Oct. 4, 2007

(30) Foreign Application Priority Data

Mar. 30, 2006    (JP) ................................ 2006-095223

(51) Int. Cl.
*G03G 15/00* (2006.01)

(52) U.S. Cl. ............................................. 399/84; 399/1
(58) Field of Classification Search ............. 399/84, 399/1; 358/1.14, 1.15
See application file for complete search history.

(56) References Cited

U.S. PATENT DOCUMENTS

| 7,405,840 | B2 * | 7/2008 | Yamaguchi | ............... 358/1.18 |
| 7,454,528 | B2 | 11/2008 | Kanoshima et al. | |
| 2005/0105920 | A1 * | 5/2005 | Matsunaga | ................ 399/1 |
| 2005/0200910 | A1 | 9/2005 | Kanoshima et al. | |
| 2009/0051942 | A1 | 2/2009 | Kanoshima et al. | |
| 2010/0103451 | A1 * | 4/2010 | Tsuzuki | ................ 358/1.15 |
| 2010/0214592 | A1 * | 8/2010 | Muroi | ................ 358/1.14 |

FOREIGN PATENT DOCUMENTS

| JP | 2000296653 | | 10/2000 |
| JP | 2001080135 | A * | 3/2001 |
| JP | 2002-259595 | A | 9/2002 |
| JP | 2004284250 | | 10/2004 |
| JP | 2005047231 | A | 2/2005 |
| JP | 2005115688 | | 4/2005 |
| JP | 2005-225100 | A | 8/2005 |
| JP | 2005-280045 | A | 10/2005 |
| JP | 2005319672 | | 11/2005 |
| JP | 2006062312 | A | 3/2006 |

OTHER PUBLICATIONS

Computer translation of JP2005-280045.*
Translation of jp2006-062312a; Mar. 9, 2006.*
Office Action issued Dec. 10, 2009 in corresponding Japanese Patent Application No. 2006-095223, and English translation thereof.
Office Action issued Mar. 23, 2010 in corresponding Japanese Application No. JP 2006-095223, and English translation thereof.

* cited by examiner

*Primary Examiner* — Quana M Grainger
(74) *Attorney, Agent, or Firm* — Banner & Witcoff, Ltd.

(57) ABSTRACT

An image forming apparatus according to the present invention can include an image forming unit that forms an image on a sheet material having a memory capable of storing information, and a writing unit that is configured to send next use information to the memory, the next use information based on a current image formation on the sheet material by the image forming unit, the next use information usable in a next image formation.

19 Claims, 22 Drawing Sheets

FIG.11

| PRINTED SURFACE | REVERSE |
|---|---|
| DIRECTION OF SHEET OBVERSE SIDE | NONE |
| DIRECTION OF SHEET REVERSE SIDE | BOTTOM |
| SHEET DIRECTION INFORMATION | RIGHT TOP |
| SHEET INVERSION DIRECTION | LONGITUDINAL |
| NUMBER OF ALLOTMENT ON OBVERSE SIDE | 1 |
| NUMBER OF ALLOTTED PAGES ON OBVERSE SIDE | 1 |
| NUMBER OF ALLOTMENT ON REVERSE SIDE | 0 |
| NUMBER OF ALLOTTED PAGES ON REVERSE SIDE | 0 |

FIG.15

| PRINTED SURFACE | OBVERSE |
|---|---|
| DIRECTION OF SHEET OBVERSE SIDE | TOP |
| DIRECTION OF SHEET REVERSE SIDE | NONE |
| SHEET DIRECTION INFORMATION | LEFT TOP |
| SHEET INVERSION DIRECTION | NONE |
| NUMBER OF ALLOTMENT ON OBVERSE SIDE | 1 |
| NUMBER OF ALLOTTED PAGES ON OBVERSE SIDE | 1 |
| NUMBER OF ALLOTMENT ON REVERSE SIDE | 0 |
| NUMBER OF ALLOTMENT ON REVERSE SIDE | 0 |
| JOB ID | 0001 |
| USER NAME | USER 01 |
| PAGE NUMBER | 1 |

FIG.16

| SHEET DIRECTION INFORMATION | LEFT TOP |
|---|---|
| SHEET INVERSION DIRECTION | LONGITUDINAL |
| NUMBER OF ALLOTMENT ON OBVERSE SIDE | 1 |
| NUMBER OF ALLOTTED PAGES ON OBVERSE SIDE | 1 |
| NUMBER OF ALLOTMENT ON REVERSE SIDE | 1 |
| NUMBER OF ALLOTTED PAGES ON REVERSE SIDE | 1 |
| JOB ID | 0001 |
| USER NAME | USER 01 |
| PAGE NUMBER | 1 |

FIG.18

| SHEET DIRECTION INFORAMTION | LEFT TOP |
|---|---|
| SHEET INVERSION DIRECTION | NONE |
| NUMBER OF ALLOTMENT ON OBVERSE SIDE | 9 |
| NUMBER OF ALLOTTED PAGES ON OBVERSE SIDE | 5 |
| NUMBER OF ALLOTMENT ON REVERSE SIDE | 0 |
| NUMBER OF ALLOTTED PAGES ON REVERSE SIDE | 0 |
| USER NAME | USER 01 |

FIG.21

| SHEET DIRECTION INFORMATION | LEFT TOP |
|---|---|
| SHEET INVERSION DIRECTION | NONE |
| NUMBER OF ALLOTMENT ON OBVERSE SIDE | 9 |
| NUMBER OF ALLOTTED PAGES ON OBVERSE SIDE | 8 |
| NUMBER OF ALLOTMENT ON REVERSE SIDE | 0 |
| NUMBER OF ALLOTTED PAGES ON REVERSE SIDE | 0 |
| USER NAME | USER 01 |

FIG.22

| SHEET DIRECTION INFORMATION | LEFT TOP |
|---|---|
| SHEET INVERSION DIRECTION | NONE |
| NUMBER OF ALLOTMENT ON OBVERSE SIDE | 1 |
| NUMBER OF ALLOTTED PAGES ON OBVERSE SIDE | 1 |
| NUMBER OF ALLOTMENT ON REVERSE SIDE | 0 |
| NUMBER OF ALLOTTED PAGES ON REVERSE SIDE | 0 |
| USER NAME | USER 01 |

IMAGE FORMING APPARATUS WITH A WRITING UNIT

CROSS REFERENCE TO RELATED APPLICATION

This application claims priority from Japanese Patent Application No. 2006-095223 filed Mar. 30, 2006. The entire content of this priority application is incorporated herein by reference.

TECHNICAL FIELD

The disclosure relates to an image forming apparatus.

BACKGROUND

Japanese Patent Application Publication No. 2004-284250 discloses art in which the direction of the sheet set for printing is identified based on the RFID (Radio Frequency-Identification) tag embedded in the sheet. In the disclosed art, the RFID tag on the sheet is scanned to detect the tag position or the sheet direction information, whereby the reverse/obverse side or top/bottom side of the sheet to be fed is identified.

In the art disclosed in Japanese Patent Application Publication No. 2004-284250, in the case where the same sheet is repeatedly used for printing, it is difficult to reflect the previously printed content on the sheet in the next printing. In the case where an image corresponding to the currently printed image is formed on the same sheet at the next printing operation, for example, if the next printing is performed with the currently printed content not being accurately remembered (for example, the next printing is performed after a long passage of time from the previous printing), the correlation between the current and the subsequent printing results fails to satisfy the user's requirement, resulting in unintended printing. Also, in the case where a first user prints an image and then a second user prints another image that reflects the image printed by the first user, an unintended image is obtained in the end if the accurate information has not been shared between the users.

SUMMARY

In the aforementioned circumstance, the art for realizing the image formation that appropriately reflects the previous image formation.

According to the present invention, the next use information recorded in the memory based on the content of the current image formation may be used for the next image formation. This allows the next image formation which appropriately reflects the current image formation to be appropriately performed.

The term "content of image formation" includes the content that represents the direction of the sheet on which the current image formation is performed, the content that represents obverse/reverse side of the sheet on which the current image formation is performed, the content that identifies the user who has performed the current image formation, the content that locates the area of the sheet on which the current image formation is performed (alternatively, the area of the sheet on which the current image formation is not performed), and the content that identifies the page on which the current image formation is performed (alternatively, the page on which the current image formation is not performed).

BRIEF DESCRIPTION OF THE DRAWINGS

Illustrative aspects in accordance with the present invention will be described in detail with reference to the following figures wherein:

FIG. 11 is an explanatory view representing the sheet information recorded in the IC chip;

FIG. 15 is an explanatory view representing the sheet information for printing on the obverse side of the sheet;

FIG. 16 is an explanatory view representing the sheet information for printing on the reverse side of the sheet;

FIG. 18 is an explanatory view representing the sheet information in the case where the image has been formed halfway in the allotment printing;

FIG. 21 is an explanatory view representing the sheet information after adding the images corresponding to the three pages to the images formed as shown in FIG. 17; and FIG. 22 is an explanatory view representing the sheet information in the case where the printing in the one-side mode is performed.

DETAILED DESCRIPTION

Figure 1:
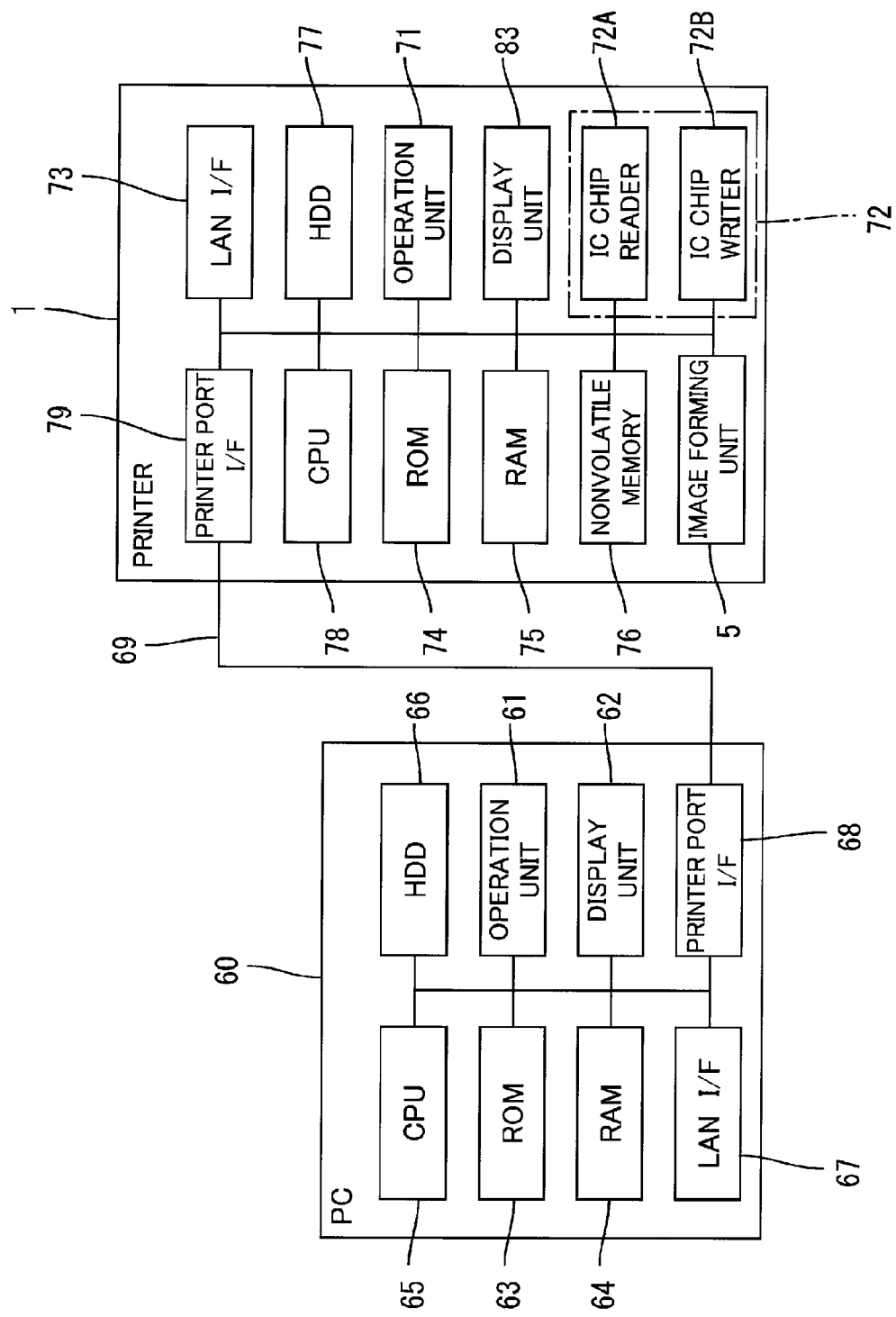
FIG. 1 is a block diagram of a printing system formed by connecting a laser printer according to an aspect of the present invention to a personal computer.

A aspect of the present invention will be described referring to the drawings.

Figure 2:
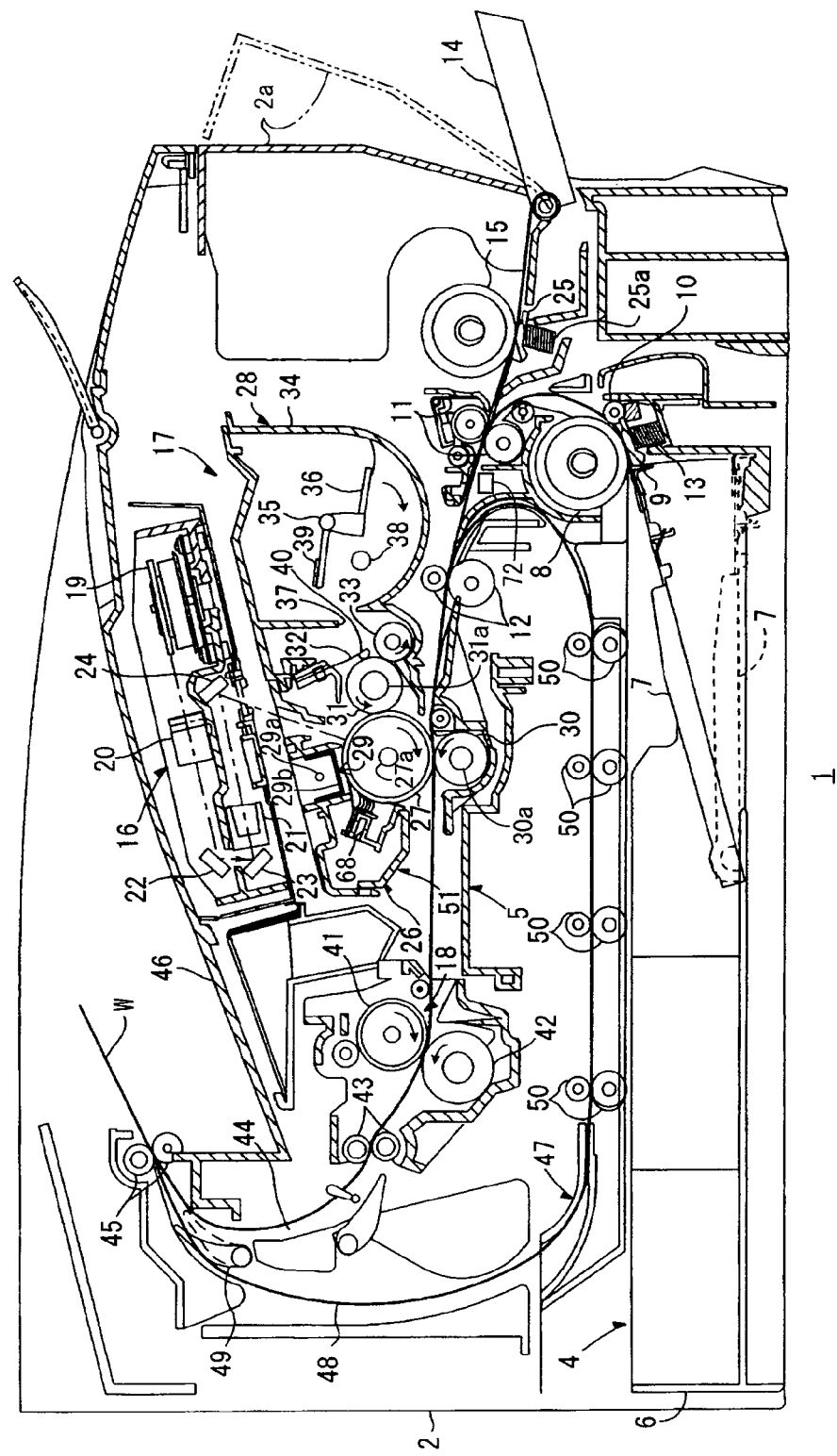
FIG. 2 is a sectional side elevation schematically showing a structure inside the laser printer.
Figure 3:
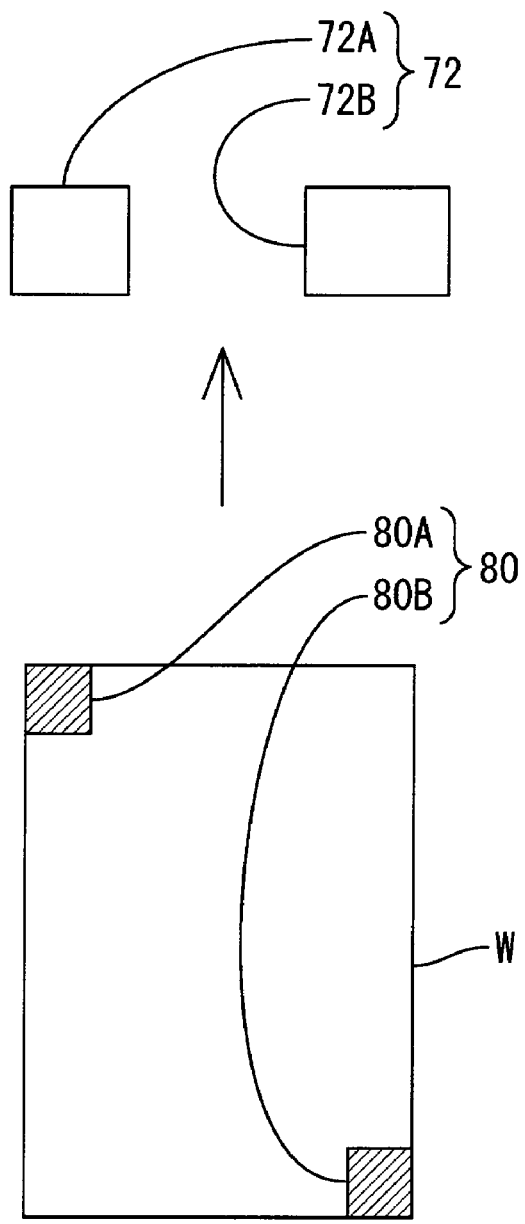
FIG. 3 is a view of a sheet in which IC chips are embedded.

FIG. 1 is a block diagram showing a structure of a printing system formed by connecting a laser printer according to the aspect (hereinafter referred to as "printer 1" which is an exemplary "image forming apparatus") to a personal computer (hereinafter referred to as "PC 60"). FIG. 2 is a sectional side elevation schematically showing the structure inside the printer 1. FIG. 3 is a view of a sheet material (for example, a sheet of paper) W having IC chips embedded therein.

(Structure of Printing System)

Referring to FIG. 1, in the printing system, the PC 60 is connected to the printer 1 via a cable 69, for example. When receiving printing data transmitted from the PC 60, the printer 1 performs printing based on the printing data.

1. Personal Computer

Referring to FIG. 1, the PC 60 includes an operation unit 61 that receives an input from an external device (a console such as a keyboard, a mouse, or the like), a display unit 62 such as a display, a ROM 63, a RAM 64, a CPU 65, a hard disk (HDD) 66, a LAN interface 67, and a printer port interface 68. The operation through the operation unit 61 allows the information which contains the printing data and the like to be transmitted and received between the printer 1 and the PC 60 via the printer port interface 68.

The display unit 62 displays various set menus for printing images.

The hard disk 66 stores the application software for creating the information to be printed, and the printer driver for the printer 1 that performs the printing operation. The CPU 65 reads the application software and the printer driver from the hard disk 66 based on a command from the operation unit 61 to execute the predetermined process.

When the CPU 65 receives the printing request from the operation unit 61 through the user's input operation, the image data created by the application software is sent to the printer driver so as to be converted into the PDL data, for example. Then the data transmission is performed via the printer port interface 68.

2. General Structure of Printer

FIG. 2 is a sectional side elevation of the printer 1 schematically showing its structure.

The printer 1 is provided, within a body frame 2, with a feeder unit 4 that feeds the sheet material W and an image forming unit 5 for forming an image on the fed sheet material W. In the explanation hereinafter, the right side of FIG. 2 will be defined as the front side of the printer 1.

(1) Feeder Unit

The feeder unit 4 includes a feeder tray 6 which is detachably set in the body frame 2 at its bottom, and a platen 7 disposed within the feeder tray 6.

The platen 7, which is capable of carrying a stack of sheet materials W, is swingably supported at an end (rear end) remote from a feeder roller 8 so that the other end (front end) close to the feeder roller 8 can move up and down. Also, the platen 7 is urged upward from the backside with a spring (not shown). The feeder roller 8 and a separation pad 9 are disposed opposite with each other such that the separation pad 9 is pressed toward the feeder roller 8 by a spring 13 attached to the backside of the separation pad 9.

The top sheet of the stack of the sheet materials W on the platen 7 is pressed thereby toward the feeder roller 8. This sheet is gripped between the feeder roller 8 and the separation pad 9 as the feeder roller 8 rotates, and fed one by one thereafter.

The paper dust adhered on the fed sheet material W is removed by paper dust cleaning rollers 10 and 11. The sheet material W is then fed to registration rollers 12. The sheet material W is then registered by the registration rollers 12, and further fed to an image forming position.

Note that the feeder unit 4 includes a multi-purpose tray 14, a feeder roller 15 and a separation pad 25 for feeding the sheet material W stacked on the multi-purpose tray 14. The feeder roller 15 and the separation pad 25 are disposed opposite each other, and the separation pad 25 is pressed toward the feeder roller 15 by a spring 25a attached to the backside of the separation pad 25.

The sheet material W stacked on the multi-purpose tray 14 is gripped between the feeder roller 15 and the separation pad 25 due to the rotation of the feeder roller 15, and then is fed one by one.

(2) Image Forming Unit

The image forming unit 5 includes a scanner unit 16, a process cartridge 17 and a fixation unit 18.

(a) Scanner Unit

The scanner unit 16 is disposed inside the body frame 2 at the upper portion thereof. A laser beam emitted from a laser emitting portion (not shown) based on the image data transmits or reflects off a polygon mirror 19, a lens 20, reflection mirrors 22 and 23, a lens 21, and a reflection mirror 24 in this order, as shown by a chain line in FIG. 2, and is irradiated on the surface of a photosensitive drum 27 of the process cartridge 17 through high speed scanning.

(b) Process Cartridge

The process cartridge 17 is disposed below the scanner unit 16, and includes a drum cartridge 26 detachably set to the body frame 2, and a development cartridge 28 accommodated in the drum cartridge 26. A front cover 2a is attached to the front surface of the body frame 2 as shown in FIG. 2 so as to be opened and closed with respect to the center axis at the lower end side. The process cartridge 17 is accommodated within the body frame 2 so as to be detachable through the opening of the front cover 2a.

The development cartridge 28 is accommodated so as to be detachable with respect to the drum cartridge 26, and includes a development roller 31, a layer thickness regulating blade 32, and a toner storage unit 34.

The toner storage unit 34 stores positively charged toner of non-magnetic single content.

The toner stored in the toner storage unit 34 is agitated in the arrowed direction (clockwise) by an agitator 36 supported at a rotary shaft 35 provided at the center of the toner storage unit 34, and discharged from a toner outlet 37 opened at the rear side of the toner storage unit 34. Windows 38 for detecting the level of the toner are provided at both side walls of the toner storage unit 34 (side walls in the direction orthogonal to the left-to-right direction in FIG. 2), and are cleaned by wipers 39 supported at the rotary shaft 35.

A feed roller 33 is rotatably disposed to the rear of the toner outlet 37, and a development roller 31 is rotatably disposed opposite the feed roller 33. The feed roller 33 and the development roller 31 abut with each other such that they are both compressed to a certain degree.

The development roller 31 is formed by coating a metal roller shaft 31a with a roller formed of a conductive rubber material.

The layer thickness regulating blade 32 is disposed adjacent to the development roller 31, and is supported by the development cartridge 28 near the development roller 31. A pressure member 40 is brought into pressure contact with the development roller 31 under the elastic force of the blade body.

As the feed roller 33 rotates, the toner discharged through the toner outlet 37 is supplied to the development roller 31 and is positively friction charged between the feed roller 33 and the development roller 31. The toner fed onto the development roller 31 enters between the pressure member 40 of the layer thickness regulating blade 32 and the development roller 31, as the development roller 31 rotates. The toner, which is a thin layer with a uniform thickness, is thus carried on the development roller 31.

The drum cartridge 26 includes a cartridge frame 51, the photoconductor drum 27 disposed within the cartridge frame 51, a charger unit 29, a transfer roller 30 and a cleaning brush 68.

The photoconductor drum 27 is disposed opposite the development roller 31 to the rear thereof, and is rotatably supported by the drum cartridge 26. The photoconductor drum 27 includes a cylindrical drum body and a metal drum shaft 27a that supports the drum body and is disposed at the axial center thereof.

The charger unit 29 is disposed above the photoconductor drum 27 with a predetermined gap so as not to be in contact therewith and is supported by the drum cartridge 26. The charger unit 29 is a scorotron type charger for positive charging, which allows a charger wire 29a to generate corona discharge. A grid 29b is interposed between the charger wire 29a and the photoconductor drum 27 such that the surface of the photoconductor drum 27 is uniformly positively charged. The charging bias voltage is applied to the charger wire 29a.

As the photoconductor drum 27 rotates, its surface is uniformly positively charged by the charger unit 29, and thereafter exposed to the high speed scanning of the laser beam from the scanner unit 16 such that an electrostatic latent image based on the image data is formed.

As the development roller 31 rotates, the positively charged toner carried on the surface of the development roller 31 is brought into contact with the opposite photoconductor drum 27. In conjunction with this, the toner is supplied to and selectively carried on the electrostatic latent image formed on the surface of the photoconductor drum 27 so that the image is visualized and developed.

The transfer roller 30 is disposed opposite the photoconductor drum 27 therebelow, which is rotatably supported by the drum cartridge 26. The transfer roller 30 is formed by coating a metal roller shaft 30a with a roller formed of a conductive rubber material. The transfer bias is applied to the transfer roller 30 during the transfer operation.

The cleaning brush 68 is disposed opposite the drum body of the photoconductor drum 27 in contact therewith. The cleaning brush is formed of a conductive member to which the cleaning bias voltage is applied such that the negatively charged paper dust adhered to the photoconductor drum 27 is electrically sucked and removed.

(c) Fixation Unit

The fixation unit 18 is disposed to the rear of the process cartridge 17 at the downstream side, as shown in FIG. 2. The fixation unit 18 heat fixes the toner transferred on the sheet material W in the process cartridge 17 while the sheet material W is passing between the heat roller 41 and a pressure roller 42. Thereafter, the sheet material W is fed to a discharge path 44 by a conveyor roller 43 and then to discharge rollers 45. The discharge roller 45 discharges the sheet material W onto the catch tray 46.

The printer 1 includes an inverse conveyor unit 47 for forming the image on both sides of the sheet material W. The inverse conveyor unit 47 includes the discharge rollers 45, an inverse conveyor path 48, a flapper 49, and a plurality of inverse conveyor rollers 50. When the image is printed on both sides of the sheet material W (or on the reverse side only), the sheet material W that has been carried to the discharge rollers 45 on a normal conveyor path (path passing along the discharge path 44 or the like) is carried on the inverse conveyor unit 47 due to the reverse rotation of the discharge roller 45. As a result, the sheet material W is inverted so that the image can be printed on the reverse side of the sheet material W. By using the inverse conveyor path 48, the flapper 49, and the plurality of inverse conveyor rollers 50 to perform a reverse side printing, it is possible to perform a double-side printing with a single operation of feeding. In the present aspect, a double-side printing process with a single feeding operation will be referred to as "automatic double-side printing process", and a double-side printing process with a multiple feeding operation will be referred to as "double-side printing process", or double-side printing (described later).

Note that the conveyor rollers 43, the discharge rollers 45 and the CPU 78 (described later) constitute an exemplary discharge mechanism.

(Electric Structure of Printer)

The printer 1 includes: an operation unit 71 through which various operations are input; a display unit 83 formed of a liquid crystal panel for performing various displays; an IC chip reader/writer 72 that reads/writes information with respect to an IC chip 80 formed as the RFID tag; the image forming unit 5 that forms (prints) an image on the sheet material W; an ROM 74; a RAM 75; a nonvolatile memory 76; the CPU 78; a printer port interface 79 connected to the PC 60 and the like via a printer cable 69; a LAN interface 73; and a hard disk drive 77.

The operation unit 71 is disposed at the front end of the upper surface of the printer 1, for example, and may be formed of buttons and a liquid crystal touch panel that allow the user to perform various operations.

The CPU 78 subjects the printing data sent from the PC 60 to the printer language processing, and transmits the resultant data to the image forming unit 5. The image forming unit 5 prints the information corresponding to the printing data to the sheet material W based on the transmitted data. The image forming unit 5 also performs various processings (described later) in accordance with the program recorded in the ROM 74.

Note that the CPU 78 serves as, for example, the control unit, a detection unit, a first determination unit, a second determination unit, an identification unit, a verification unit, a first alarm unit, a second alarm unit, and the discharge mechanism.

(IC Chip Reader/Writer)

The IC chip reader/writer 72 having the same structure as that of the generally known IC chip reader/writer can include an IC chip reader 72A and an IC chip writer 72B. The IC chip reader/writer 72 is placed at a position such that it can read or write the IC chip 80 on the sheet material W to be carried. The information data stored in the IC chip 80 embedded in the sheet material W may be scanned (read) and rewritten (written if the information data have not been stored) by emitting electric waves from an antenna (not shown). In the present aspect, the IC chip reader/writer 72 is placed at the position upstream of the image forming unit 5 on the sheet conveyor path (more specifically, upstream of the registration rollers 12) as shown in FIG. 2. Therefore, the IC chip 80 can be scanned by the IC chip reader/writer 72 before the sheet material W reaches the image forming unit 5, and thus the image forming unit 5 can form the image based on the scanned data.

The data of the IC chip 80 scanned by the IC chip reader/writer 72 are sent to the CPU 78. In the present aspect, a pair of the IC chip readers/writers 72A and 72B are placed for the purpose of reading and writing the data of the IC chips 80A and 80B embedded at the left and right corners of the sheet material W, respectively. FIG. 3 shows that the sheet material W is carried around the IC chip reader/writer 72 viewed from the direction orthogonal to the sheet material W (that is, viewed from above). The sheet W is carried above the pair of IC chip readers/writers 72A and 72B.

3. Structure of the Sheet Material

In the present aspect, the image forming apparatus is structured to feed the sheet material W by the feeder tray 6 and the multi-purpose tray 14. The sheet material W contains the IC chip 80 (formed as the RFID tag, which is an exemplary "memory") that stores the information as the electronic data, as shown in FIG. 3. The sheet material W contains two IC chips 80 (80A, 80B) embedded therein such that they are invisible from outside. More specifically, referring to FIG. 3, the IC chip 80A is embedded at a corner of the rectangular sheet material W, and the IC chip 80B is embedded at the diametrically opposite corner.

4. Control Operation

Figure 4:
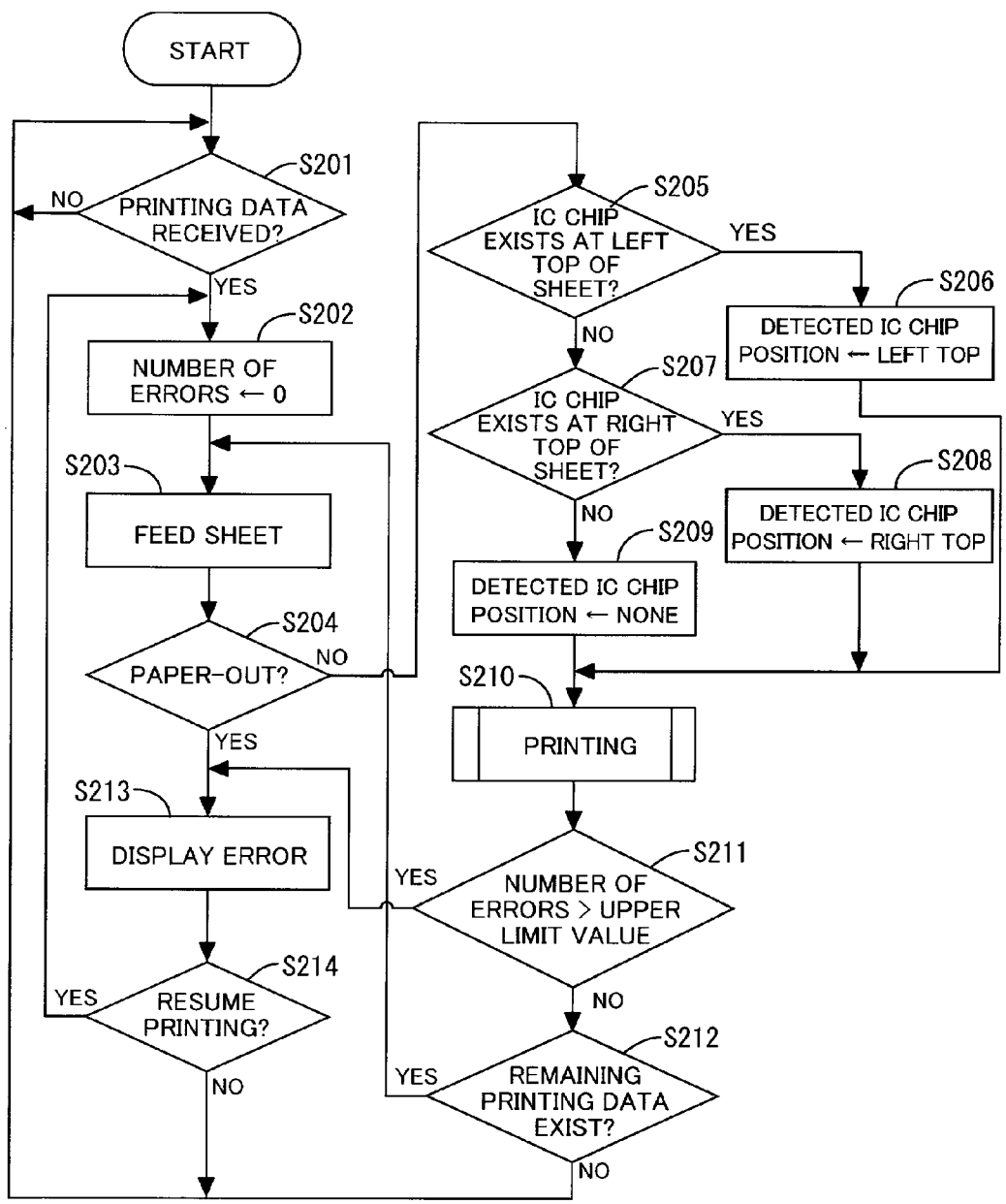
FIG. 4 is a flowchart of a main routine.

The control operation executed by the printer 1 will be described. FIG. 4 is a flowchart of a main routine executed by the printer 1.

In the present aspect, the printer 1 includes a conveyor mechanism and the image forming unit 5. The conveyor mechanism carries the sheet material W having the IC chip 80 in which the information is recorded, and includes the feeder roller 8, the paper dust cleaning rollers 10 and 11, the registration rollers 12, and the feeder roller 15. The image forming unit 5 forms the image on the sheet material W to be carried by the conveyor mechanism. The printer 1 further includes the IC chip reader/writer 72 as a writing unit that writes the next use information to be used in the next image formation to the sheet material W into the IC chip 80 and a reading unit that reads the information of the IC chip 80, respectively. Based on the information read by the IC chip reader/writer 72, the CPU 78 controls the image formation performed by the image forming unit 5. The IC chip reader/writer 72 serving as the writing unit is structured to rewrite the information read from the IC chip 80 as the next use information. The aforementioned process will be described more specifically hereinafter.

Referring to FIG. 4, first in S201, it is determined whether the printing data have been received. If the printing data have not been received, that is, NO is obtained in S201, the standby loop is repeatedly executed until they are received. If the printing data have been received, that is, YES is obtained in S201, the process proceeds to S202 where the number of sheet errors is initialized (that is, the number of sheet errors is set to 0). In this aspect, the number of sheet errors can mean the number of times the user sets an improper sheet in the printer 1.

Next, the sheet material W is fed in S203. Then, in S204, it is determined whether the printer is in the paper-out condition. If it is in the paper-out condition, that is, YES is obtained in S204, the process proceeds to S213 where the error is displayed. More specifically, the message that directs the user to set the normal sheet (or the like) is displayed on the display unit 83. Thereafter, when a command for resuming the printing is provided, that is, YES is obtained in S214, the routine returns to S202 from where the process is repeatedly executed. When the command for resuming the printing is not provided, that is, NO is obtained in S214, the process returns to S201.

Meanwhile, if it is determined that the printer is not in the paper-out condition, that is, NO is obtained in S204, the process proceeds to S205 where it is determined whether the IC chip exists at the left top corner of the sheet material W. Because the pair of the IC chip readers/writers 72A and 72B are disposed in the printer 1 in the manner described above, it is possible to determine which of the IC chip reader/writer 72A or 72B has detected the IC chip. Further, the existence of the IC chip at the left top or the right top corner of the sheet material W may be determined based on the detection timing.

If it is determined that the IC chip exists at the left top corner of the sheet, the process proceeds to S206 where the IC chip detection position is set to "left top". Meanwhile, if it is determined that the IC chip does not exist at the left top corner of the sheet material W, that is, NO is obtained in S205, the process proceeds to S207 where it is determined whether the IC chip exists at the right top corner of the sheet material W. If it is determined that the IC chip exists at the right top corner of the sheet material W, that is, YES is obtained in S207, the process proceeds to S208 where the IC chip detection position is set to "right top".

If it is determined that the IC chip does not exist at the right top corner of the sheet material W, that is, NO is obtained in S207, the process proceeds to S209 where the IC chip detection position is set to "none". If any one of S206, S208 and S209 ends, the process proceeds to S210 where the printing process is executed. The printing process will be described later. After execution of the printing process, it is determined whether the number of errors exceeds a predetermined threshold value (upper limit number of sheet errors). In this aspect, the term "upper limit number of sheet errors" denotes the upper limit number of times the user may set an improper sheet in the printer 1. If the number of errors exceeds this upper limit value, the user is informed of the error. Such value is set in advance, and may be changed at any time by a controller. If the number of errors does not exceed the threshold value (upper limit number of the sheet errors), that is, NO is obtained in S211, the process proceeds to S212 where it is determined whether the remaining printing data exist. If the remaining printing data exist, that is, YES is obtained in S212, the process returns to S203 from when subsequent processes are executed repeatedly. If the remaining data do not exist, that is, NO is obtained in S212, the process returns to S201.

In the present aspect, during the next image formation, an error is informed to the user if the image formation has not been performed with regard to a data for a page among those data subjected to the printing process. That is, if YES is obtained in S204 although the remaining printing data exists, or if the number of errors exceeds the upper limit number of the sheet errors although the remaining data exist (that is, YES is obtained in S211), the image formation is not performed with regard to the data for the page. In the aforementioned case, the error is displayed. The message that the image with respect to the page data cannot be formed may be displayed. The CPU 78 and the display unit 83 serve as the "second alarm unit".

The printing process will be described hereinafter.

Figure 5:
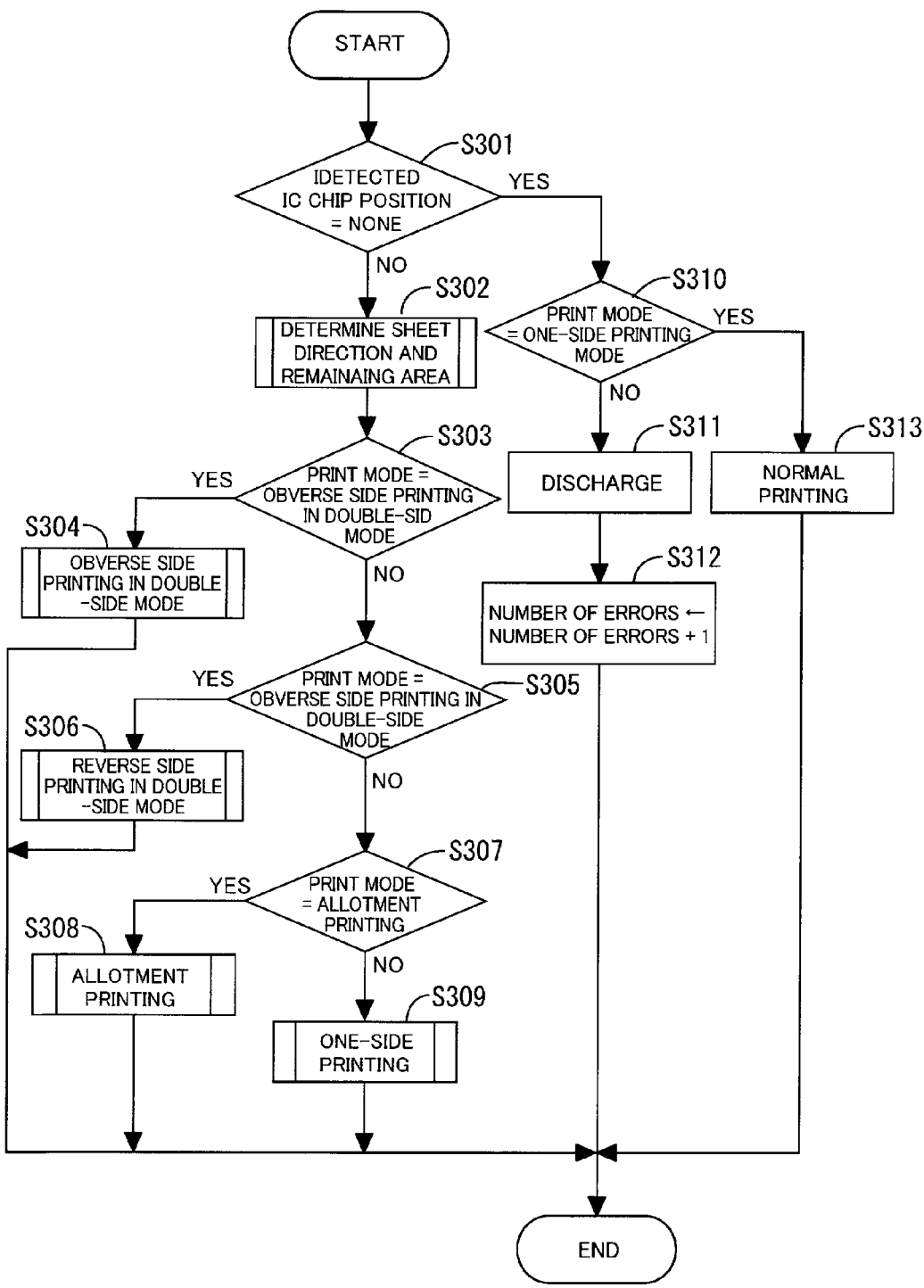
FIG. 5 is a flowchart of a sub-routine executed in S210 of the flowchart shown in FIG. 4 for the printing process.

FIG. 5 is a flowchart of the printing process executed in S210 of the main routine shown in FIG. 4. When the printing starts, it is determined whether the IC chip detection position is set to "none", that is, the IC chip is not embedded in the sheet in S301. If it is determined that the IC chip detection position is set to "none", that is, YES is obtained in S301, the process proceeds to S310 where it is determined whether the printing mode is set to a one-side mode. If the one-side printing mode is not set, that is, NO is obtained in S310, the process proceeds to S311 where the sheet is discharged without being printed. This is because the appropriate printing cannot be ensured in the next cycle if the sheet with no IC chip embedded is used in a mode other than the one-side mode. The process further proceeds to S312 where the number of errors is counted up. Meanwhile, if it is determined that the one-side printing mode is set, that is, YES is obtained in S310, the process proceeds to S313 where the normal printing is performed. This is because the printing direction or the printing area of the sheet are not limited.

Meanwhile, if it is determined that the IC chip detection position is not set to "none" in S301, the process proceeds to S302 where the determination is made with respect to the sheet direction and the remaining area. The process for determination with respect to the sheet direction and the remaining area will be described later. Thereafter, it is determined whether the obverse side printing in the double-side mode is set in S303. As the information of the printing mode is contained in the printing data to be sent, the printing mode may be determined by reading the printing data.

If it is determined that the obverse side printing in the double-side mode is set, that is, YES is obtained in S303, the process proceeds to S304 where the obverse side printing in the double-side mode is performed. If the obverse side printing in the double-side mode is not set, that is, NO is obtained in S303, the process proceeds to S305 where it is determined whether the reverse side printing in the double-side mode is set. If it is determined that the reverse side printing is set in the double-side mode, that is, YES is obtained in S305, the process proceeds to S306 where the reverse side printing in the double-side mode is performed. If it is determined that the reverse side printing in the double-side mode is not set, that is, NO is obtained in S305, the process proceeds to S307 where it is determined whether the printing mode is set to the allotment printing mode. If it is determined that the printing mode is set to the allotment printing mode, that is, YES is obtained in S307, the process proceeds to S308 where the allotment printing is performed (described later). If it is determined that the printing mode is not set to the allotment printing mode, that is, NO is obtained in S307, the process proceeds to S309 where the one-side printing is performed (described later).

Figure 6:
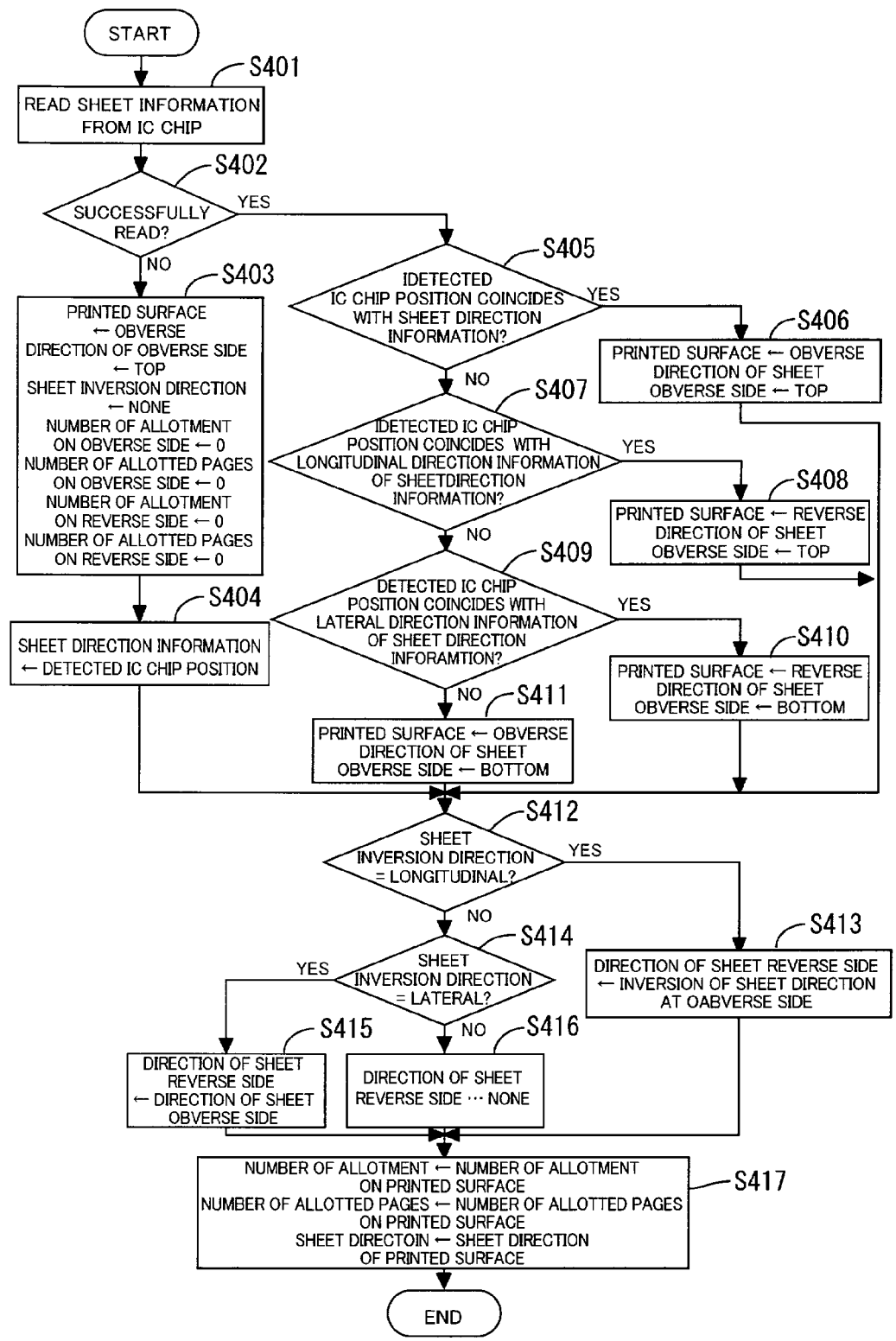
FIG. 6 is a flowchart of a routine for making a determination with respect to a sheet direction and a remaining area.

Then the process for determining the sheet direction and the remaining area will be described referring to FIG. 6.

In the present aspect, the position information with respect to the position of the IC chip 80 embedded in the sheet material W is written in the IC chip 80. Based on the position of the IC chip 80 detected in the image formation (IC chip detection position), and the position information scanned by the IC chip reader/writer in the previous image formation, the determination is made with respect to the direction of the sheet material W in the current image formation relative to the direction of the sheet material W in the previous image formation. The CPU 78, serving as the control unit, sets the image data subjected to the image formation in a direction corresponding to the determined direction of the sheet material W, when the image formation is performed. Based on the set image data, the image formation is performed by the image forming unit 5.

The IC chip reader/writer 72 is structured to write in the IC chip the page information relevant to at least one of the page of data on which the image has been already formed on the sheet material W, and the page of data on which the image has not been formed among those subjected to the printing job. The CPU 78 controls the image forming unit 5 to form the image of data of the page on which the image has not been formed based on the page information scanned by the IC chip reader/writer 72 upon the image formation. The aforementioned process will be described in detail below.

In S401, the sheet information is read from the IC chip 80. The sheet information can include, information on the sheet direction, the sheet inversion direction, the number of allotment on the sheet, the number of allotted pages on the sheet, the number of allotment on the reverse side, and the number of allotted pages on the reverse side, as specified in the table of FIG. 11. The term "sheet direction information" is an example of the "position information that indicates the position of the memory on the sheet material". The information on the number of allotment and the information on the number of allotted pages can be examples of the "information relevant to the enabled area" where the image is allowed to be formed on the sheet material, and the "information relevant to the inhibited area" where the image formation on the sheet material is inhibited.

In S402, it is determined whether the reading is successfully performed. If the reading is successfully performed, YES is obtained in S402. In this case, the successful reading indicates that the data are stored in the IC chip 80. If the data are not stored, it is assumed that the reading of the IC chip 80 is performed for the first time, and NO is obtained in S402. Then the process proceeds to S403 where the IC chip 80 is initialized. The initialization information includes the printed surface set to "obverse side", the obverse side direction set to "top", the reverse side direction set to "none", and the sheet inversion direction set to "none". The number of allotment on the obverse side, the number of allotted pages on the obverse side, the number of allotment on the reverse side, the number of allotted pages on the reverse side are each set to 0. The sheet direction information is set to the IC chip detection position in S404.

Figure 12:
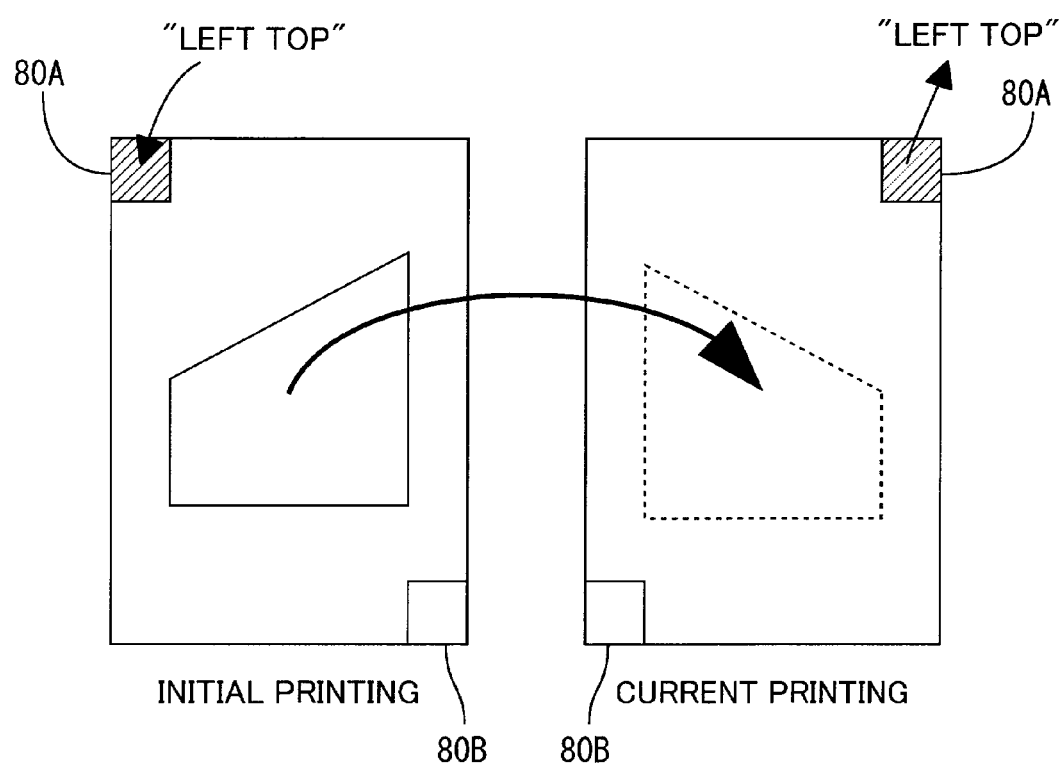
FIG. 12 is an explanatory view representing the lateral inversion of the sheet.

Meanwhile, if the sheet information is successfully read in S402, that is, YES is obtained, the process proceeds to S405 where it is determined whether the IC chip detection position coincides with the sheet direction information. The state where the IC chip detection position coincides with the sheet direction information means that the sheet material W is set in the direction and on the surface that are the same as those in the printing when the sheet information is written. Accordingly, YES is obtained in S405, and the process further proceeds to S406 where the printed surface is set to "obverse side", and the direction of the obverse side of the sheet is set to "top". Meanwhile, if the IC chip detection position does not coincide with the sheet direction information, that is, NO is obtained in S405, the process proceeds to S407 where it is determined whether the IC chip detection position coincides with the longitudinal direction information of the sheet direction information. If the IC chip detection position coincides with the longitudinal direction information of the sheet direction information, that is, YES is obtained in S407. The process then proceeds to S408 where the printed surface is set to "reverse side", and the direction of the obverse side of the sheet is set to "top". In the case where the first printing is performed as shown in the left side of FIG. 12, for example, the information "left top" is written into the left top IC chip 80A as the sheet direction information. When the sheet material W is set to be reversed in the left-to-right direction as shown by the right side of FIG. 12, the information "left top" is read from the right top IC chip 80A. In the case where the data coincide with respect to the longitudinal direction information "top", the process in S408 is executed.

Figure 13:
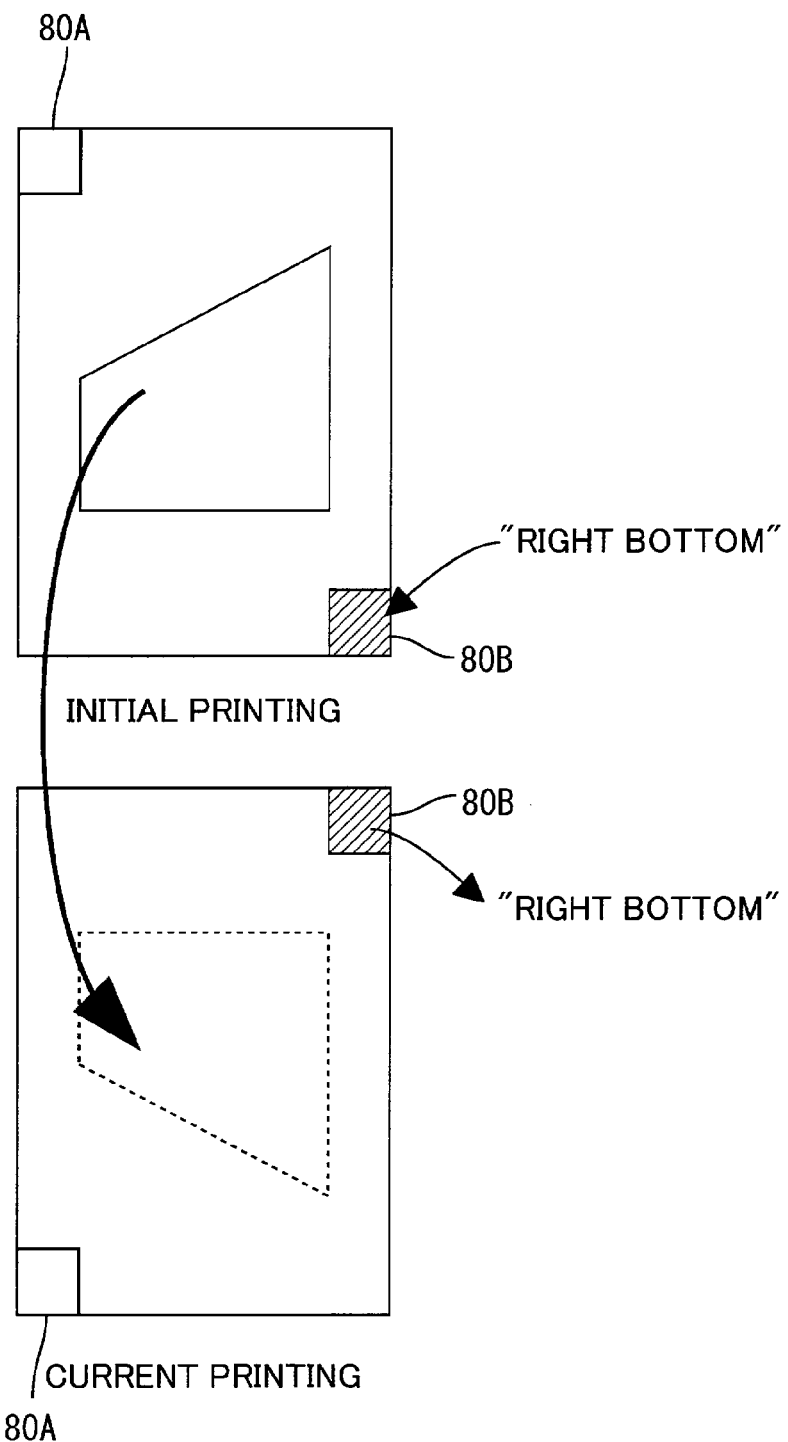
FIG. 13 is an explanatory view representing the longitudinal inversion of the sheet.
Figure 14:
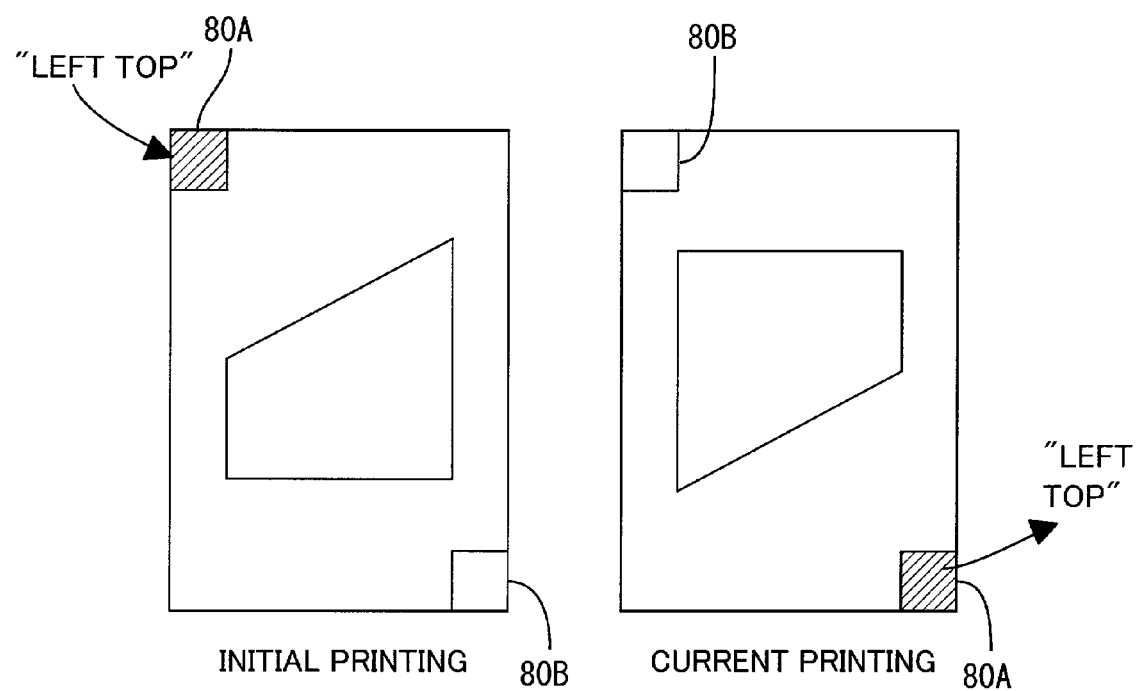
FIG. 14 is an explanatory view representing the sheet turned at 180° without being inverted.

If the IC chip detection position does not coincide with the longitudinal direction information of the sheet direction information, that is, NO is obtained in S407, the process proceeds to S409 where it is determined whether the IC chip detection position coincides with the lateral direction information of the sheet direction information. If the IC chip detection position coincides with the lateral direction information, that is, YES is obtained in S409, the process proceeds to S410 where the printed surface is set to "reverse side", and direction of the obverse side of the sheet is set to "bottom". FIG. 13 shows the state where the sheet material W is set through inversion in the longitudinal direction. In this case, the information of "right bottom" is initially written in the IC chip 80B at the right bottom position. Subsequent to the inversion, the information "right bottom" is read from the IC chip 80B at the right top corner as shown in the drawing. In this case, both data coincide with respect to the lateral direction information "right". Accordingly, YES is obtained in S409 and the process proceeds to S410.

If the IC chip detection position does not coincide with the lateral direction information of the sheet direction information, that is, NO is obtained in S409, the process proceeds to S411 where the printed surface is set to "obverse side", and the direction of the obverse side of the sheet is set to "bottom". In this case, the surface of the sheet is made the same as that of the initially printed sheet, and turned at 180° from the previous printing position.

It is then determined whether the sheet inversion direction is "longitudinal" in S412. If it is "longitudinal", the direction of the reverse side of the sheet becomes opposite to the direction of the obverse side of the sheet. Accordingly, the process proceeds to S413 where the direction of the reverse side of the sheet is made opposite to the direction of the obverse side of the sheet. Meanwhile, if it is not "longitudinal", that is, NO is obtained in S412, the process proceeds to S414 where it is determined whether the sheet inversion direction is "lateral". The state where the sheet inversion direction is "lateral" represents that the direction of the reverse side of the sheet is the same as that of the obverse side of the sheet. Accordingly, YES is obtained in S414. The process then proceeds to S415 where the direction of the reverse side of the sheet is made the same as that of the obverse side of the sheet. The state where the sheet inversion direction is not lateral represents that the sheet inversion direction is "none" and the printed surface is kept at the obverse side. Therefore, the direction of the reverse side of the sheet is set to "none" in S416.

In S417, the read number of allotment on the printed surface, the read number of allotted pages on the printed surface, and the direction of the printed surface of the sheet are fixed as values of the number of allotment, the number of allotted pages, and the sheet direction, respectively.

Figure 7:
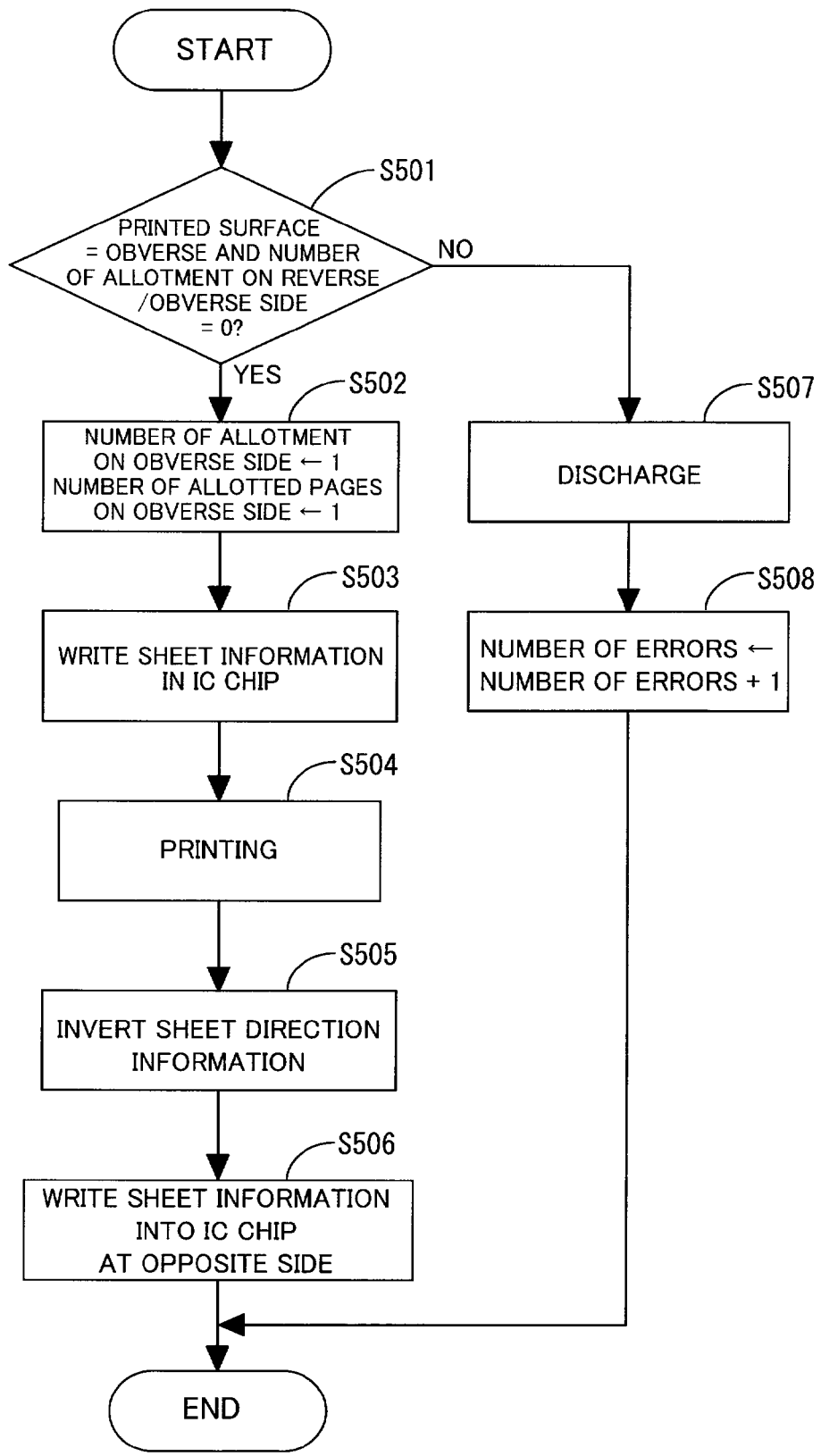
FIG. 7 is a flowchart of a routine for printing on an obverse side of the sheet in the double-side printing mode.

The obverse side printing in the double-side mode in S304 (see FIG. 5) will be described. FIG. 7 is a flowchart of the routine for executing the obverse side printing in the double-side mode. As described above, in the present aspect, the double-side printing performed by a plurality of sheet feeding operations is referred to as the "double-side printing process" (or double-side printing). Accordingly, the double-side printing process to be described later is completed by performing a plurality of double-side printing operations. Among these operations, the obverse side printing and the reverse side printing will be referred to as the obverse side printing in the double-side mode and the reverse side printing in the double-side mode, respectively.

For easy understanding of the description, in the case of the obverse side (reverse side) printing in the double-side mode, the allotment printing process is not performed. In other words, single-page data will be printed on the surface of a single page.

When the routine starts, it is determined whether the printed surface is the obverse side, and the number of allotment on the reverse/obverse side is set to 0 in S501. This is because the printing on the obverse side in the double-side mode is required to be performed on the sheet having both sides unoccupied. If it is determined that the printed surface is the reverse side, or the number of allotment on the reverse/obverse side is not set to 0, that is, NO is obtained in S501. The process proceeds to S507 where the sheet is discharged without being printed, and then the number of errors is incremented in S508. In this case, the direction of the sheet material W and the obverse/reverse side thereof are identified by the CPU 78 based on the detected position of the IC chip 80 and the read position information of the IC chip 80. It is determined whether the identified results coincide with the condition of the sheet material W on which the image is formed. If it is determined that the identified results do not coincide with the state of the sheet material W on which the image is formed, the CPU 78 stops the image formation performed by the image forming unit 5. Note that the alarm function may be added for informing the user that the identified results do not coincide with the state of the sheet material W on which the image is formed. For example, the aforementioned discordance alarm process may be added after the discharging process in S507. In this case, the CPU 78 and the display unit 83 serve as an example of the "first alarm unit".

If the printing surface is "obverse side", and the number of allotment on reverse/obverse side is set to 0, that is, YES is obtained in S501 and the process proceeds to S502 where the number of allotment on the obverse side is set to 1, and the number of allotted pages on obverse side is set to 1. The term "number of allotment" represents the number of pages obtained by dividing the sheet surface. The term "number of allotted pages" can include the number of pages obtained by dividing the sheet surface where an image cannot be printed. The number of allotment on the obverse side represents the obverse-side number of allotment, and the number of allotted pages on the obverse side represents the obverse-side number of allotted pages. This may apply to those at the reverse side. It is to be understood that the number of allotment is equal to or larger than the "number of allotted pages". The state where the number of allotment is set to 0 represents that the sheet is unoccupied. The initial value, thus, is set to 0.

In S503, the sheet information is written into the IC chip 80. The information to be written is shown by the table of FIG. 15. In this case, for the job ID, the user name (corresponding to an example of the user information), and the page number, data contained in the printing data may be used. The printing process is performed thereafter in S504. The page number is an example of the "page information relevant to the page of data that have been subjected to the image formation on the sheet material among those printing data subjected to the printing job". Then in S505, the sheet direction information is inverted for writing the sheet information in the other IC chip 80. In the inversion process performed in S505, the original sheet direction information at the left top is changed to the right bottom, and the original sheet direction information at the right top is changed to the left bottom. In S506, the sheet information is then written in the IC chip 80 different from the IC chip 80 into which the sheet information has been written in S503. Then the process ends.

Figure 8:
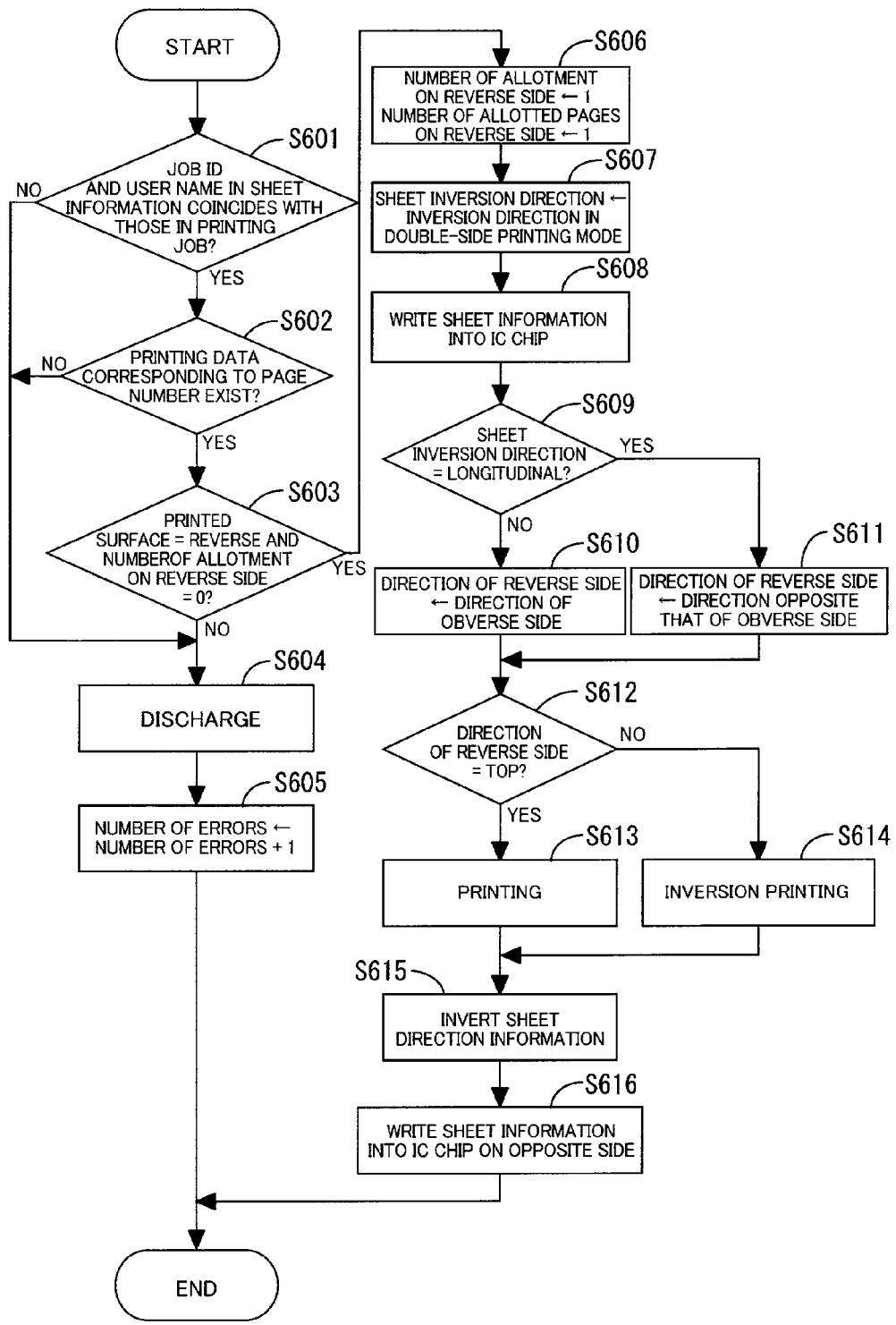
FIG. 8 is a flowchart of a routine for printing on a reverse side of the sheet in the double-side printing mode.

The reverse side printing in the double-side mode performed in S306 of FIG. 5 will be described. FIG. 8 is a flowchart of the routine for the reverse side printing in the double-side mode.

In S601, it is determined whether each of the job ID and the user name of the sheet information read from the IC chip 80 coincides with each of those contained in the printing job. If they coincide with those contained in the printing job, that is, YES is obtained in S601, the process proceeds to S602 where it is determined whether the printing data corresponding to the page number exist. In S602, it is determined whether the data of the page at the obverse side corresponding to the data printed on the reverse side are contained in the printing data. In other words, because the page number of the obverse side is contained in the sheet information read from the IC chip 80, it is determined whether the data of the page subsequent to the page number of the obverse side are contained in the printing data. If such data are contained in the printing data, that is, YES is obtained in S602, the process proceeds to S603 where it is determined whether the printed surface is at the reverse side, and the number of allotment on the reverse side is set to 0. That is, in S603, it is determined whether the sheet is set with the reverse side as the printed surface, and nothing is printed thereon.

The state where NO is obtained in any of S601, S602 and S603 represents that the set sheet is not suited to be printed. Therefore, the process proceeds to S604 where the sheet is discharged, and then to S605 where the number of errors is incremented. As described above, the direction and the obverse/reverse side of the sheet material W are identified, based on the detected position of the IC chip 80 and the position information of the IC chip 80 that has been read. It is determined whether the identified result coincides with the state of the sheet material W on which the image is formed. If it is determined that the identified result does not coincide with the state of the sheet material W on which the image is formed, the CPU 78 stops image formation performed by the image forming unit 5. Note that the alarm function may be added to inform the user that the identified result does not coincide with the state of the sheet material W on which the image is formed. For example, the discordance alarm process may be added after NO is obtained in S601, S602 and S603, respectively. In this case, the CPU 78 and the display unit 83 serve as an example of the "first alarm unit".

The state where YES is obtained in S603 represents that the sheet is correctly set for the reverse side printing in the double-side mode, and the printing data contains the data to be printed. The process proceeds to S606 where the number of allotment on the reverse side and the number of allotted pages on the reverse side are set to 1. Then in S607 the sheet inversion direction is set to the inversion direction in the double-side printing mode. The inversion direction in the double-side printing mode represents the information about the direction in which the sheet is inverted in the double-side printing. The inversion direction in the double-side printing mode is contained in the printing job as the data. The process further proceeds to S608 where the sheet information is written into the IC chip 80. Then in S609, it is determined whether the sheet inversion direction is longitudinal. The state where the sheet inversion direction is not longitudinal represents that the sheet inversion direction is lateral (see FIG. 12). Therefore, NO is obtained in S609, and the process proceeds to S610 where the direction of the reverse side of the sheet is set to the same direction as the obverse side of the sheet. Meanwhile, if the sheet inversion direction is longitudinal (see FIG. 13), that is, YES is obtained in S609, the process proceeds to S611 where the direction of the reverse side of the sheet is set to be opposite to the direction of the obverse side of the sheet. After the setting, the process proceeds to S612 where it is determined whether the direction of the reverse side of the sheet is the same as that of the obverse side. If the direction of the reverse side is the same as that of the obverse side, that is, YES is obtained in S612, the process proceeds to S613 where the normal printing is performed. If the direction of the reverse side of the sheet is not the same as that of the obverse side, that is, the direction of the reverse side of the sheet is opposite the direction of the obverse side of the sheet, the process proceeds to S614 where the inversion printing while inverting the printing data at 180° is performed. Thereafter, the sheet direction information is inverted in S615, and the sheet information is written into the IC chip 80 at the opposite side in S616. The routine then ends.

Figure 9:
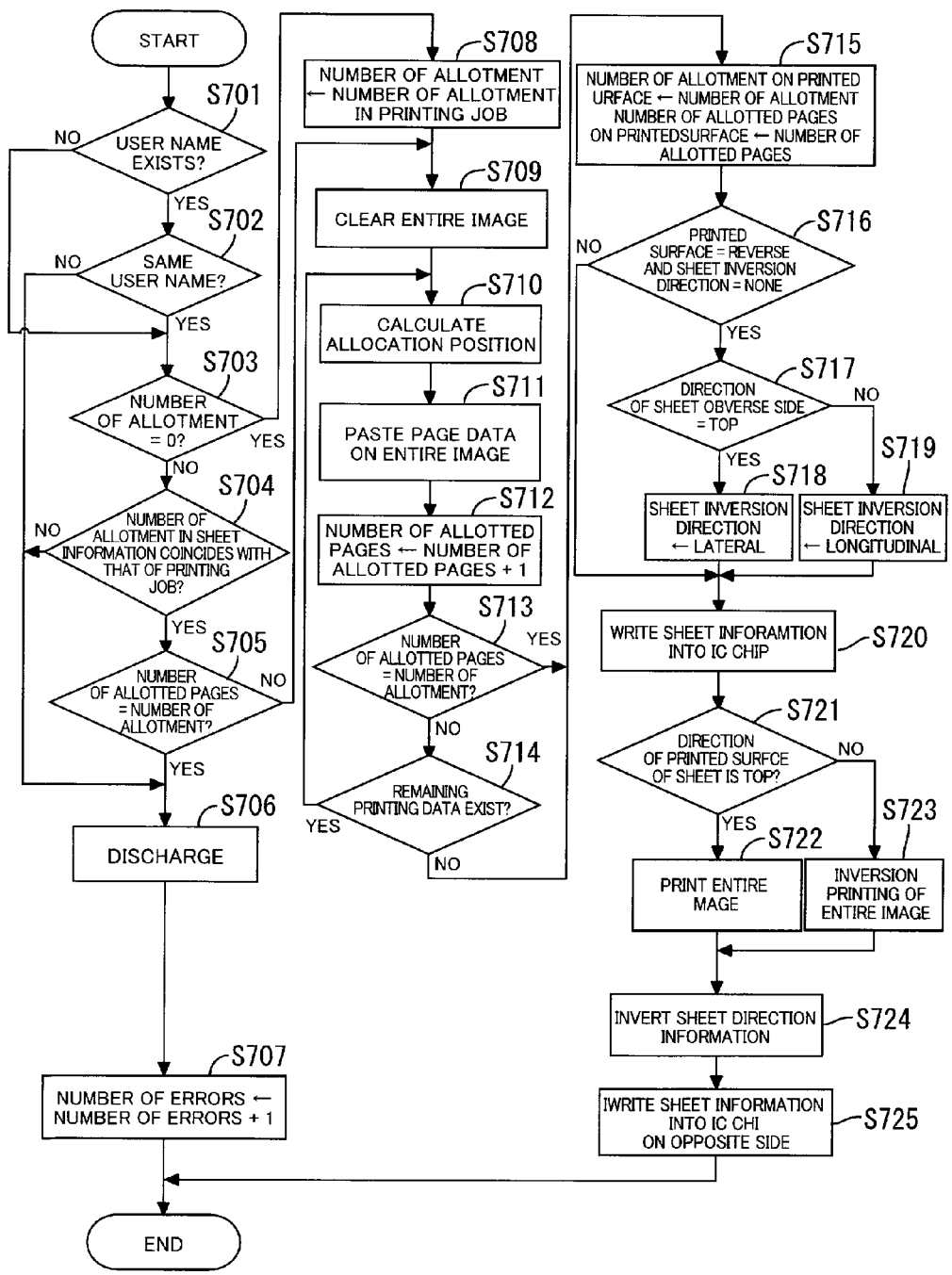
FIG. 9 is a flowchart of a routine for performing an allotment printing.

The allotment printing process executed in S308 shown in FIG. 5 will be described. FIG. 9 is a flowchart of the allotment printing process.

First in S701, it is determined whether the sheet information contains the user name. If the user name is contained, that is, YES is obtained in S701, the process proceeds to S702 where it is determined whether the user name contained in the sheet information coincides with the one contained in the printing job. If NO is obtained in S701, or YES is obtained in S702, the process proceeds to S703 where it is determined whether the number of allotment is set to 0. If the number of allotment is set to the value other than 0, the process proceeds to S704 where it is determined whether the number of allotment contained in the sheet information is the same as the one contained in the printing job. The process executed in S703 and S704 sets the limitation depending on the number of allotment. That is, the printing is only allowed when the numbers of allotment coincide with each other. This makes it possible to allow the printing job in which 4in1 is set to be added to the sheet that has been already printed through the printing job set with 4in1.

In S705, it is determined whether the number of allotted pages coincides with the number of allotment. The state where they coincide with each other represents that all the printed surfaces are occupied, that is, YES is obtained in S705. The process then proceeds to S706 where the sheet is discharged. If it is determined that the user names do not coincide with each other in S702, or the number of allotment contained in the sheet information does not coincide with the one contained in the printing job in S704, the process proceeds to S706 where the sheet is discharged. After the sheet is discharged, the process proceeds to S707 where the number of errors is incremented.

In S702, S704 and S705, it is determined whether the next use information which allows the image formation is obtained. If it is determined that the next use information which allows the image formation is not obtained, the CPU 78 controls such that the sheet is discharged without allowing the image forming unit 5 to perform the image formation.

Meanwhile, if it is determined that the number of allotment is set to 0, that is, YES is obtained in S703, the process proceeds to S708 where the "number of allotment" on the sheet is set to the number of allotment for the printing job. For example, if the printing job is performed with the number of allotment set to 9in1, the number of allotment on the sheet is set to 9.

If NO is obtained in S705, and after execution of S708, the process proceeds to S709 where the entire image is cleared for initialization. The entire image represents the image data as the base of the final printing data upon execution of the allotment printing, specifically, in the state where the data of the respective pages are pasted to the corresponding positions.

In S710, the allocation position is calculated. In the process, the position at which the next printing is performed is calculated based on the sheet size, the number of allotment and the number of allotted pages. Then in S711, the page data are pasted to the allocation positions calculated in S710 as the entire image.

Figure 17:
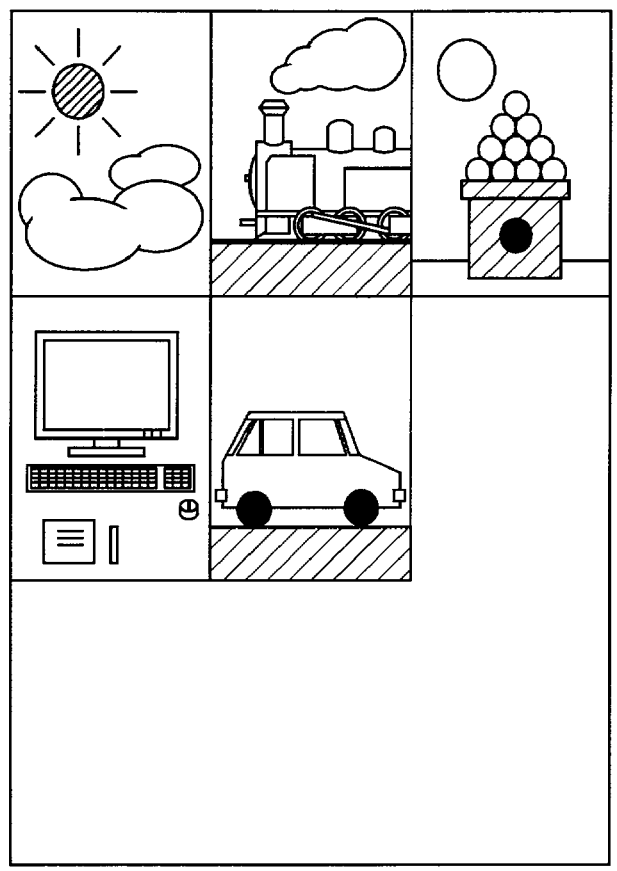
FIG. 17 is an explanatory view representing an example where the image has been formed halfway in the allotment printing.
Figure 19:
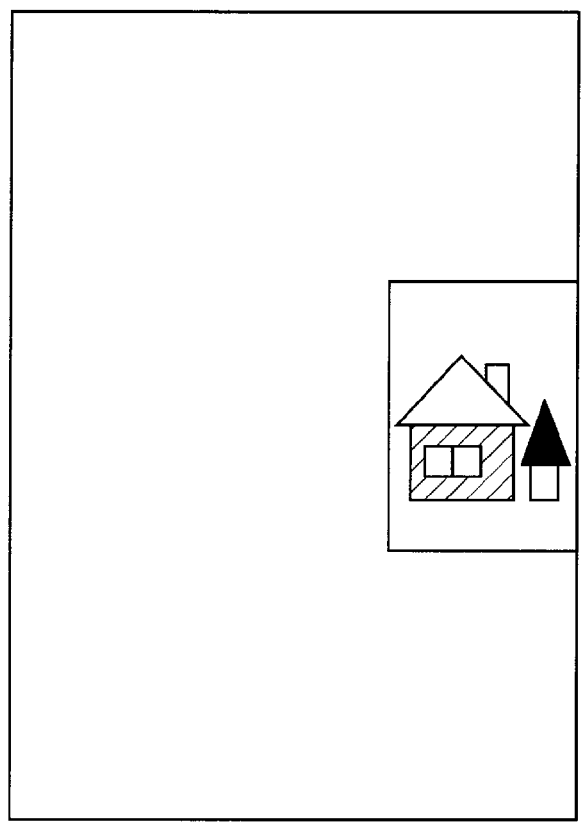
FIG. 19 is an explanatory view representing an entire image in the case where an image corresponding to a page is added to the images formed as shown in FIG. 17.

For example, the additional printing to the sheet that has been already subjected to the allotment printing as shown in FIG. 17 will be described. FIG. 17 shows the result of printing 5 page data printed onto the sheet with the number of allotment set to 9in1. The description with respect to the printing of 3 page data to the aforementioned sheet will be explained hereinafter. FIG. 18 is a table of data contained in the sheet information subsequent to the printing as shown in FIG. 17. FIG. 19 shows the result of pasting the data that is currently intended to be printed to the entire image on the sheet.

Figure 20:
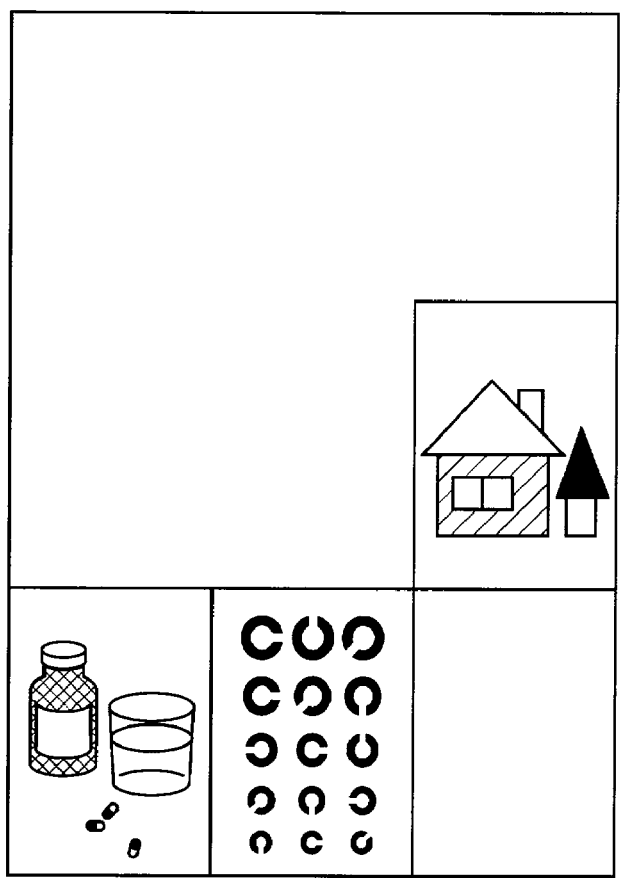
FIG. 20 is an explanatory view representing an entire image in the case where images corresponding to three pages are added to the images formed as shown in FIG. 17.

In S712, the value 1 is added to the number of allotted pages, and in S713, it is determined whether the number of allotted pages coincides with the number of allotment. If they do not coincide with each other, that is, NO is obtained in S713, the process proceeds to S714 where it is determined whether the remaining printing data exist. If the remaining printing data exist, that is, YES is obtained in S714, the process returns to S710 and subsequent steps with respect to the next page will be repeatedly executed. The loop from S710 to S714 is repeatedly executed until the number of allotted pages coincides with the number of allotment, or no remaining printing data exist. In the case where the 3-page printing data are added to the sheet as shown in FIG. 17, the loop is executed three times. When the remaining data no longer exist, NO is obtained in S714 where the entire image as shown in FIG. 20 is formed.

If YES is obtained in S713 or NO is obtained in S714, the process proceeds to S715 where the number of allotment on the printed surface is set as the number of allotment and the number of allotted pages of the printed surface is set as the number of allotted pages. In S716, it is determined whether the printed surface is set to "reverse side", and the sheet inversion direction is set to "none". If the printed surface is set to "reverse side" and the sheet inversion direction is set to "none", that is, YES is obtained in S716, the process proceeds to S717 where it is determined whether the direction of the obverse side of the sheet is set to "top". The state where it is set to "top" represents that the sheet is turned in the left-to-right direction, that is, YES is obtained in S717. Then in S718, the sheet inversion direction is set to "lateral". The state where the direction of the obverse side of the sheet is not set to "top" represents that the sheet is turned in the top-to-bottom direction. The process further proceeds to S719 where the sheet inversion direction is set to "longitudinal".

If NO is obtained in S716, or execution of S718 and S719 ends, the process proceeds to S720 where the sheet information is written into the IC chip 80. The sheet information resulting from addition of the page data as shown in FIG. 20 is listed in the table of FIG. 21.

In S721, it is determined whether the direction of the printed surface of the sheet is on the top. If it is set to top, that is, YES is obtained in S721, the process proceeds to S722 where the entire image is printed. If it is not on the top, that is, NO is obtained in S721, the process proceeds to S723 where the entire image is turned at 180°, and then printed. Then in S724, the sheet direction information is inverted, and the resultant information is written into the IC chip 80 on the opposite side in S725. The process then ends.

Figure 10:
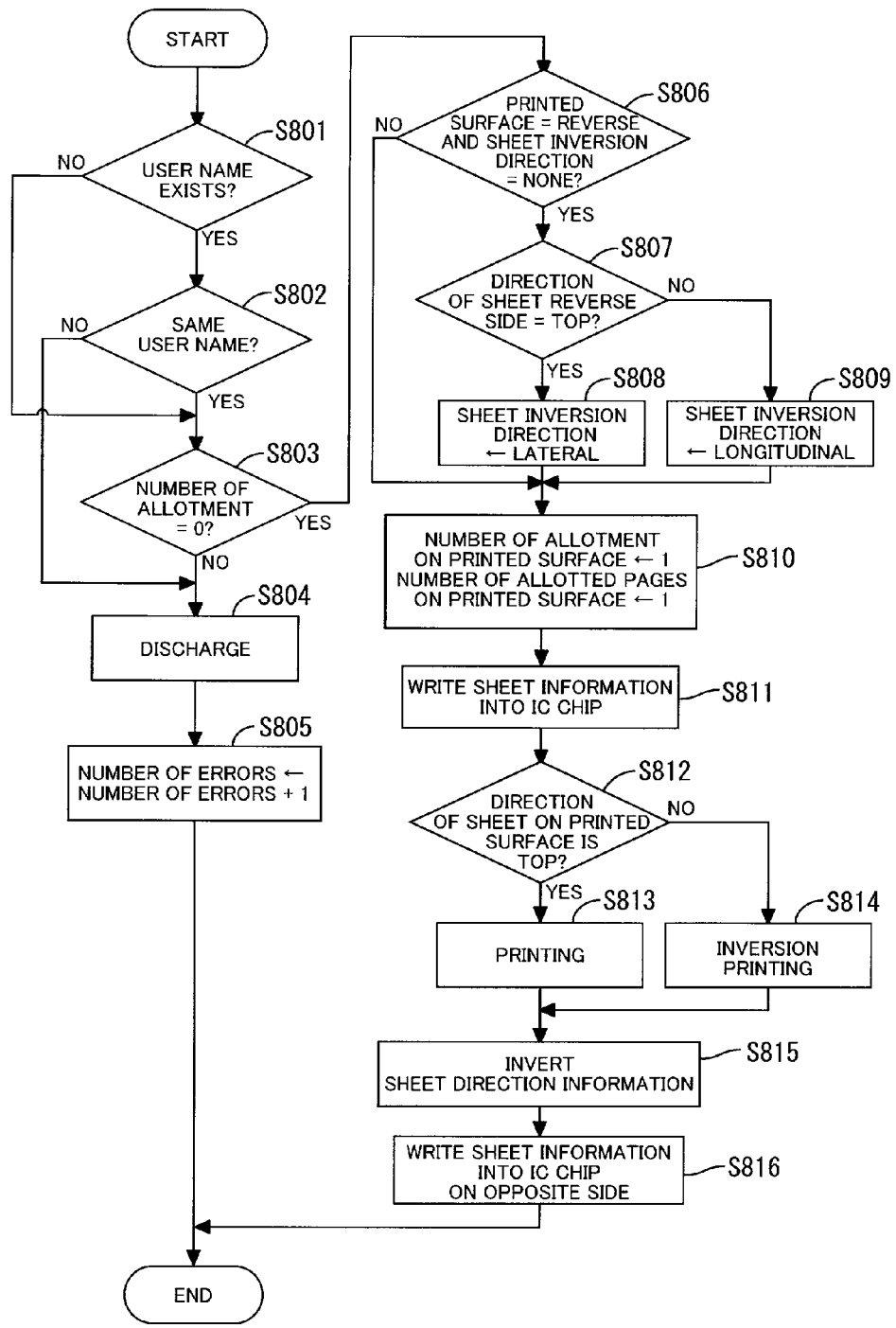
FIG. 10 is a flowchart of a routine for a one-side printing.

The one-side printing process performed in S309 of the flowchart shown in FIG. 5 will be described. FIG. 10 is a flowchart of the routine for the one-side printing process.

In S801, it is determined whether the sheet information contains the user name. If the user name is contained, the process proceeds to S802 where it is determined whether the user name contained in the sheet information coincides with the user name contained in the printing job. If they coincide with each other, that is, YES is obtained in S802, the process proceeds to S803 where it is determined whether the number of allotment is set to 0, that is, whether certain printing data have been printed on the printed surface.

The state where NO is obtained in S802 or S803 represents that such state corresponds to the condition which inhibits the printing on the sheet (the user does not coincide with the one who has performed the printing on the other surface, or the sheet has been already printed even if the allotment printing is not set (NO is obtained in S307)). Accordingly, the sheet is discharged without being printed in S804. Then in S805, the number of errors is incremented. The process then ends.

If it is determined that the number of allotment is set to 0, that is, YES is obtained in S803, the process proceeds to S806 where it is determined whether the printed surface is set to "reverse side", and the sheet inversion direction is set to "none". If the printed surface is set to "reverse side", and the sheet inversion direction is set to "none", the process proceeds to S807 where it is determined whether the direction of the obverse side of the sheet is set to the "top". If it is set to top, that is, YES is obtained in S807, the process proceeds to S808 where the sheet inversion direction is set to lateral. If it is not set to the top, that is, NO is obtained in S807, the process proceeds to S809 where the sheet inversion direction is set to longitudinal.

If NO is obtained in S806, or execution of S808 and S809 ends, the number of allotment and the number of allotted pages in the one-side printing mode are set to 1, respectively in S810. The resultant information is written into the IC chip 80 as the sheet information in S811. Then in S812, it is determined whether the direction of the sheet on which the one-side printing is performed is set towards the top. If it is determined that the direction of such sheet is set towards the top, that is, YES is obtained in S812, the printing process is performed in S813. If it is determined that the direction of such sheet is not set towards the top, that is, NO is obtained in S812, the process proceeds to S814 where the printing process with the printing data turned at 180° (inversion printing) is performed. Thereafter, the sheet direction information is inverted in S815, and the resultant information is written into the IC chip 80 on the opposite side in S816. The process then ends.

<Another Aspect>

The present invention is not limited to that which has been described above and referred to in the drawings, and the following aspects may be contained in the scope of the present invention.

(1) In the aspect, a pair of memories (IC chips) are provided at the respective corners of the sheet. However, the position of the memory is not limited to the one described above. In the aspect, two IC chip readers/writers are provided. However, one IC chip reader/writer or 3 or more IC chip readers/writers may also be employed.

(2) In the aspect, the writing unit and the reading unit are provided. However, a structure including only a writing unit may also be employed.

(3) In the aspect, the page on which the printing is inhibited is identified based on the number of allotted pages. However, the area on which the printing is inhibited or the area on which the printing is allowed may be identified based on the coordinate information. Assuming that the position of the IC chip 80A is set to the original point, and the lateral direction and the longitudinal direction of the sheet material W are set to X-coordinate and Y-coordinate, respectively. Further, the area on which the image is formed or the area on which the image is not formed may be identified by the coordinate information based on the printed data so as to be stored in the IC chip 80. For example, the origin of the area that inhibits the printing or the area that allows the printing, and the size of the corresponding area (lengths in the X and Y directions) may be identified to be stored in the IC chip 80. This makes it possible to satisfy the area on which printing of the next image is allowed or the area on which the printing of the next image is inhibited.

What is claimed is:

1. An image forming apparatus comprising:
a conveyor mechanism for conveying a sheet material having a memory capable of storing information;
an image forming unit that forms an image on the sheet material conveyed by the conveyor mechanism;
a reading unit that is configured to read information stored in the memory; and
a writing unit that is configured to rewrite the information read by the reading unit by using a content of a current image formation and send rewritten information as next use information to the memory,
wherein:
the next use information is usable in a next image formation on the sheet material; and
the image forming unit performs the current image formation on the sheet material on the basis of the content of the current image formation, wherein the content of the current image formation is based on the information read by the reading unit.

2. The image forming apparatus according to claim 1, further comprising a detection unit that detects a position of the memory, wherein the writing unit writes position information which represents said position of said memory of the sheet material into the memory.

3. The image forming apparatus according to claim 1, wherein the writing unit is configured to send user information to the memory.

4. The image forming apparatus according to claim 1, wherein the writing unit is configured to send page information that relates to at least one of a page of image which have been already subjected to an image formation on the sheet material, and a page of image which have not been subjected to the image formation.

5. The image forming apparatus according to claim 1, wherein the writing unit is configured to send information related to an area of the sheet material where an image formation is allowed.

6. The image forming apparatus according to claim 1, wherein the writing unit is configured to send information related to an area of the sheet material where an image formation is inhibited.

7. The image forming apparatus according to claim 1, further comprising:
a control unit that controls an image formation performed by the image forming unit based on information received by the reading unit.

8. The image forming apparatus according to claim 7, wherein:
the writing unit is configured to send position information that represents a position of the memory of the sheet material to the memory, and includes:
a detection unit that detects a position of the memory of the sheet material; and
a first determination unit that determines a direction of the sheet material based on the position of the memory detected by the detection unit and the position information read by the reading unit, and
the control unit sets image data which allow formation of an image in the direction corresponding to that of the sheet material as determined by the first determination unit at the time of image formation, and controls the image forming unit to perform an image formation based on the set image data.

9. The image forming apparatus according to claim 7, wherein:
the writing unit is configured to send position information to the memory, the position information represents a position on the sheet material, further
a detection unit that detects a position of said memory on the sheet material;
an identification unit that identifies at least one of a direction obverse side of the sheet and a reverse side of the sheet material based on a position of the memory detected by the detection unit, and position information with respect to the memory received by the reading unit; and
a verification unit that determines whether a result of identification performed by the identification unit coincides with a state of the sheet material subjected to an image formation, wherein at the time of image formation, the control unit stops image formation performed by the image forming unit when a result identified by the identification unit does not coincide with a state of the sheet material subjected to image formation.

10. The image forming apparatus according to claim 9, further comprising a first alarm unit that turns on when the verification unit determines that the result identified by the identification unit does not coincide with the state of the sheet material subjected to image formation.

11. The image forming apparatus according to claim 7, wherein:
the writing unit is configured to write page information that relates to at least one of a page which has been subjected to image formation on the sheet material, and a page that has not been subjected to image formation; and
the control unit configured to control said image forming unit to perform image formation with respect to a page which has not been subjected to the image formation.

12. The image forming apparatus according to claim 11, further comprising a second alarm unit that activates when an image formation is not performed with respect to the page among printing image.

13. The image forming apparatus according to claim 7, further comprising:
a discharge mechanism that discharges the sheet material conveyed by the conveyor mechanism; and
a second determination unit that determines whether the next use information is obtained, wherein
the control unit is capable of allowing the discharge mechanism to discharge the sheet material without the image formation performed by the image formation unit.

14. The image forming apparatus according to claim 7, wherein:
the writing unit is configured to write information that relates to an area of the sheet material where an image formation is allowed; and
the control unit controls the image forming unit to form an image on the area at the time of image formation.

15. The image forming apparatus according to claim 7, wherein:
the writing unit writes information related to an area of the sheet material where an image formation is inhibited; and
the control unit controls the image forming unit to form an image in an area other than the area at the time of image formation.

16. An image forming apparatus comprising:
an image forming unit that forms an image on a sheet material having a memory capable of storing information; and a reading unit that is configured to read information stored in the memory; and a writing unit that is configured to rewrite the information read by the reading unit by using a content of a current image formation and send rewritten information as next use information to the memory, wherein:

the next use information is usable in a next image formation on the sheet material; and the image forming unit performs the current image formation on the sheet material on the basis of the content of the current image formation, wherein the content of the current image formation is based on the information read by the reading unit.

17. The image forming apparatus according to claim 16, further comprising a detection unit that detects a position of the memory, wherein the writing unit writes position information which represents the position of the memory of the sheet material into the memory.

18. The image forming apparatus according to claim 16, wherein the writing unit is configured to send information related to an area of the sheet material where an image formation is allowed.

19. The image forming apparatus according to claim 16, wherein the writing unit is configured to send information related to an area of the sheet material where an image formation is inhibited.

* * * * *